United States Patent [19]
Shirtum

[11] Patent Number: 5,245,057
[45] Date of Patent: Sep. 14, 1993

[54] HORIZONTAL CONTINUOUS REACTOR AND PROCESSES

[75] Inventor: Robert P. Shirtum, Freeport, Tex.

[73] Assignee: The Dow Chemical Company, Midland, Mich.

[21] Appl. No.: 971,450

[22] Filed: Nov. 4, 1992

Related U.S. Application Data

[63] Continuation-in-part of Ser. No. 848,630, Mar. 9, 1992, abandoned, which is a continuation-in-part of Ser. No. 555,863, Jul. 20, 1990, abandoned.

[51] Int. Cl.$^5$ .................. C07D 301/27; C07D 301/28; C07D 301/30; C07C 37/52
[52] U.S. Cl. ........................... 549/517; 422/135; 549/514; 549/515; 549/521; 549/522; 568/781
[58] Field of Search ............... 549/514, 515, 517, 121, 549/522; 568/781

[56] References Cited

U.S. PATENT DOCUMENTS

| | | | |
|---|---|---|---|
| 1,672,016 | 6/1928 | Williams et al. | 23/285 |
| 1,895,517 | 1/1933 | Lewis | 549/522 |
| 2,567,842 | 9/1951 | Erickson | 549/521 |
| 2,582,899 | 1/1952 | Barnebey et al. | 23/290 |
| 2,644,009 | 6/1953 | Cash et al. | 260/475 |
| 2,680,109 | 6/1954 | Stevens et al. | 549/521 |
| 2,727,882 | 12/1955 | Vodonik | 260/75 |
| 2,801,227 | 7/1957 | Goppel | 549/517 |
| 2,840,541 | 6/1958 | Pezzaglia | 549/517 |
| 2,943,095 | 6/1960 | Farnham et al. | 549/517 |
| 2,986,551 | 5/1961 | Griffin et al. | 549/517 |
| 2,986,552 | 5/1961 | Landug et al. | 549/517 |
| 3,069,434 | 12/1962 | Spence et al. | 549/517 |
| 3,129,232 | 4/1964 | Terford et al. | 549/517 |
| 3,221,032 | 11/1965 | Price et al. | 260/348.6 |
| 3,251,657 | 5/1966 | Bachmann et al. | 27/285 |
| 3,385,881 | 5/1968 | Bachmann et al. | 260/475 |
| 3,549,332 | 12/1970 | Yoon | 23/270.5 |
| 3,639,652 | 2/1972 | Mommaerts et al. | 260/30.8 DS |
| 3,849,451 | 11/1974 | Stein et al. | 549/529 |
| 3,927,983 | 12/1975 | Gordon et al. | 23/260 |
| 4,008,133 | 2/1977 | Gelbein et al. | 549/522 |
| 4,017,523 | 4/1977 | Vargiu | 260/348.6 |
| 4,099,926 | 7/1978 | Gutlhuber | 23/246 |
| 4,289,895 | 9/1981 | Burkhardt et al. | 560/92 |
| 4,313,886 | 2/1982 | Massingill | 260/344.15 |
| 4,370,470 | 1/1983 | Vidaurri et al. | 528/388 |
| 4,452,760 | 6/1984 | Peterson et al. | 422/148 |
| 4,496,753 | 1/1985 | Kwon et al. | 549/521 |
| 4,751,280 | 6/1988 | Pham et al. | 528/95 |
| 4,873,376 | 10/1989 | Dujardin et al. | 568/781 |

FOREIGN PATENT DOCUMENTS

| | | |
|---|---|---|
| 2032174 | 6/1991 | Canada . |
| 210447 | 1/1982 | Czechoslovakia . |
| 212856 | 12/1983 | Czechoslovakia . |
| 0434124 | 6/1991 | European Pat. Off. . |
| 1091568 | 10/1960 | Fed. Rep. of Germany . |
| 2745150 | 6/1978 | Fed. Rep. of Germany . |
| 2909706 | 10/1980 | Fed. Rep. of Germany . |
| 213226 | 9/1984 | German Democratic Rep. . |
| 218767 | 2/1985 | German Democratic Rep. . |
| 2095679 | 10/1982 | United Kingdom . |

Primary Examiner—Joseph E. Evans

[57] ABSTRACT

A continuous horizontal reactor system and process for employing such a system. In one embodiment, a reactor system having a cylindrical multi-compartment vessel, the compartments intercommunicating via a common overhead space or separated spaces from which vapor with reaction product or by-products may be removed, and from which liquid effluent with reaction products or by-products may be removed and reactants and catalyst flowable into each compartment and agitators in each compartment. Such a reactor system for producing liquid epoxy resins. Processes using such a reactor to produce reaction products, e.g. liquid epoxy resins.

24 Claims, 7 Drawing Sheets

HORIZONTAL CONTINUOUS REACTOR AND PROCESSES

CROSS-REFERENCE TO RELATED APPLICATIONS

This application is a continuation-in-part of application Ser. No. 07/848,630 filed on Mar. 9, 1992 (now abandoned) which is a continuation-in-part of application Ser. No. 07/555,863 filed on Jul. 20, 1990 (now abandoned), all of which are incorporated herein in their entirety.

FIELD OF THE INVENTION

This invention relates to methods and apparatuses continuously producing reaction products from the reaction of reactant materials in a horizontal reactor and, in one particular aspect to producing epoxy resins and in one embodiment to a horizontal continuous epoxy resin reactor and processes using it for producing epoxy resins.

BACKGROUND OF THE INVENTION

Epoxy resins' superior toughness, chemical resistance, heat resistance, adhesion and electrical properties have contributed to their wide use in electrical and structural applications and in protective coatings. An epoxy group (1,2-epoxide or oxirane), a three-membered cyclic ether group, characterizes the epoxy resins. A curing agent reacts with these monomers or prepolymers to produce high performance thermosetting plastics.

The diglycidyl ethers of bisphenol A are a common form of epoxy resin. They are produced by well known processes such as the reaction of dihydric phenols and epihalohydrin. In one such process the epihalohydrin and dihydric phenol react in the presence of a catalyst to produce a halohydrin-containing resin intermediate which is then reacted with a basic acting material, e.g. sodium hydroxide. Treatment of the resulting reaction mixture, such as by water-washing, removes residual catalyst and salt, producing a liquid epoxy resin.

Various dihydric phenols are employed; e.g. hydroquinone, resorcinol, catechol, and bisphenols. Suitable epihalohydrins which can be employed herein include, for example, epichlorohydrin, epibromohydrin, epiiodohydrin, methylepichlorohydrin, methylepibromohydrin, methylepiiodohydrin, mixtures thereof and the like. Suitable catalysts include, for example, quaternary ammonium compounds, quaternary phosphonium compounds, sulfonium compounds and the like.

Suitable quaternary ammonium catalysts include, for example, tetramethyl ammonium chloride, benzyl trimethyl ammonium chloride, triethanol ammonium chloride, tetraethanol ammonium hydroxide, dodecyl dimethylbenzyl ammonium naphthenate and the like. Suitable quaternary phosphonium catalysts include, for example, those quaternary phosphonium compounds disclosed in U.S. Pat. Nos. 3,948,855, 3,477,990 and 3,341,580 and Canadian 858,648 all of which are incorporated herein by reference. Other catalysts are ethyl triphenyl phosphonium iodide, ethyl triphenyl phosphonium bicarbonate, ethyl triphenyl phosphonium acetate-acetic acid complex, benzyl triphenyl phosphonium chloride, tetrabutyl phosphonium chloride, benzyl trimethyl ammonium chloride mixtures thereof and the like. Suitable sulfonium catalysts include thiourea catalysts such as, for example, tetramethyl thiourea; N,N'-dimethyl thiourea; N,N'-diphenyl thiourea; mixtures thereof and the like as well as thiodiethanol and other sulfonium precursors.

Also suitable as catalysts are the basic ion exchange resins such as, for example, DOWEX® MSA-1, DOWEX® 11, DOWEX® SBR, mixtures thereof and the like.

Specific processes for producing epoxy resins are described in these U.S. Pat. Nos. 4,313,886; 2,986,551; 3,069,434; 2,840,541; 3,221,032; 4,017,523; 4,751,280; and 4,008,133; and in various foreign references, including Great Britain 2,095,679; West Germany 2,909,706 and 2,745,150; East Germany 218,76 and 213,226; and Czechoslovakia 212,856 and 210,447. Known processes for producing liquid epoxy resins from bisphenol-A and excess epichlorohydrin are either continuous or discontinuous processes operating in the presence of an alkali metal hydroxide in quantities of 2 moles, or about 2 moles, for every mole of bisphenol-A.

In a typical discontinuous process, a concentrated aqueous solution of alkali metal hydroxide is fed to a solution of bisphenol-A in epichlorohydrin at atmospheric or slightly lower than atmospheric pressure. The temperature is controlled to continuously distill the water introduced with the alkali metal hydroxide as an azeotropic mixture with the epichlorohydrin. After completion of the addition of the solution of alkali metal hydroxide, all the water is removed, the unreacted epichlorohydrin is recovered by distillation at pressures lower than atmospheric, and the alkali metal chloride, a sub-product of the reaction is separated by filtration of the solids or dissolution in water with subsequent dilution of the brine/organic mixture. Liquid epoxy resins obtained in such a process have a high viscosity, an undesirable color, and because of their relatively high chlorine content, are not suitable for various applications. Liquid epoxy resins made this way can have a residual chlorine content of the order of 0.5-0.8% by weight.

Several methods of producing liquid epoxy resins by a continuous process, by effecting the reaction of the bisphenol-A with the epichlorohydrin in a number of reactors installed in series are well known in the art. In such processes, the bisphenol-A and the epichlorohydrin are continuously fed to a first reactor, while the alkali metal hydroxide in aqueous solution is introduced into each reactor up to a maximum quantity equal, or about equal to 2 moles for every mole of bisphenol-A. The reaction products are discharged continuously from the last reactor and are subjected to decantation to separate the liquid epoxy resin from the water and the alkali metal chloride which is a by-product of the reaction.

In various conventional processes, the reaction is carried out in the presence of oxygenated organic substances of alcoholic or ketonic nature. The presence of extraneous substances in these procedures can cause a decrease in the purity of the resin produced, and the reactive substances such as the alcohols or the ketones can give rise to secondary reactions with formation of various sub-products. The added substances are eventually separated from the liquid epoxy resin, and are purified before recycling them to the reaction. The liquid epoxy resin is separated from the water and the alkali metal halide which is a sub-product of the reaction.

In other prior art processes, chemistries for various reactions are carried out in batch reactors with vapor removal and concurrent reactant addition systems. To conduct such reactions in a continuous flow process would require: 1) relatively fast reaction kinetics (e.g. 1 to 2 minutes) in a pipe reactor, or 2) an infinite series of continuous stirred tank reactors (in practice 10 to 20 reactors in series).

In the past, reaction of a dichlorohydrin aqueous intermediate with an alkali metal salt to epoxidize the dichlorohydrin results in side reactions with the water present which give rise to hydrolysis products which include glycerin monochlorohydrin, glycidol, and glycerin itself. These by-products are all undesirable because they are difficult to remove from the aqueous effluent of the process.

There has long been a need for an effective and efficient continuous reactor and for processes employing such a reactor. There has long been a need for an effective and efficient continuous process for producing liquid epoxy resins. There has long been a need for apparatus for use in such processes. There has long been a need for a continuous process for the production of liquid epoxy resins in which reaction by-products may be removed at various stages in the process. There has long been a need for a continuous process for the production of liquid epoxy resins in which catalysts and reactants can be added in a staged manner to minimize yield losses to undesirable side reactions.

SUMMARY OF THE PRESENT INVENTION

The present invention provides processes and apparatuses for the effective continuous production of reaction products from the reaction of reactant materials in a horizontal continuous reactor; e.g., but not limited to liquid epoxy resins. In one embodiment of the present invention, a horizontal continuous flow-through reactor system is provided that employs a multi-compartment device with intercommunicating compartments all on substantially the same horizontal level and separated by overflow weirs. Reactants flow into a first compartment where reaction is initiated; into intermediate compartments, if any; then to a final compartment from which liquid epoxy resins are discharged or withdrawn. Epihalohydrin and an active hydrogen containing species (e.g., but not limited to active hydrogen species, amines, organic acids, and bisphenols) are fed into an initial compartment and reacted with an alkali hydroxide to form a glycidyl derivative (e.g., but not limited to a glycidyl ether) of the active hydrogen containing species. An organic cosolvent may be added to enhance the solubility of the alkali salt of the active hydrogen containing species in the organic phase. By-product water formed in the reaction is codistilled with solvent to maintain a desired concentration of water in the compartment. The feed rate of the epihalohydrin and active hydrogen containing species and the compartment size affect the extent of the reaction, i.e., the residence time.

The liquid product from the initial compartment overflows a weir into the next adjacent compartment. Additional alkali hydroxide is added to this compartment and further reaction occurs. Additional reaction compartments are used to insure sufficient time for the reaction of the hydroxide. These additional compartments, or "digestion stages" need not have any catalyst added into them and the residence time in the additional digestion stages may be varied depending on the desired conversion of product being produced.

In one embodiment vapor may be removed from any or all compartments simultaneously since there is a common space above all the compartments in communication with each other compartment. In another embodiment, stirrers can be provided in any compartment and in one embodiment are provided in each compartment. In embodiments with multiple stirrers, each stirrer may have an individual shaft and motor or two or more stirrers can be disposed on one shaft, driven by one motor. By-product water removal minimizes yield losses to unwanted side reactions as does the co-addition of catalyst and reactant alkali hydroxide. Undesirable by-products of a reaction can be removed in the vapor phase so that subsequent removal from the liquid product or effluent is not required. Alternatively, in a process according to the present invention in which the desired reaction product is removed in the vapor phase, undesired by-products are removable in the liquid effluent. In liquid epoxy resin processes according to the present invention the staged addition of a suitable solvent (e.g., but not limited to, the product itself, e.g. epichlorohydrin) and of additional aqueous hydroxide with the immediate removal of water through azeotropic distillation with the solvent minimizes the possibility of reaction with the epichlorohydrin, reducing the amount of undesirable hydrolysis products. In another embodiment, underflow weirs may be employed in one or more compartments with vapor removal therefrom to permit control of vapor composition.

It is, therefore, an object of the present invention, to provide new, unique, efficient, effective, and non obvious processes and apparatuses for the continuous production of reaction products in a horizontal reactor, e.g. liquid epoxy resins.

Another object of the present invention is the provision of such processes in which a multi-compartment horizontal reactor system is employed having a plurality of intercommunicating compartments with a common overhead space.

Yet another object of the present invention is the provision of such a process and apparatus in which vapor containing reaction products or by-products may be removed from some or all of the compartments, simultaneously if desired.

An additional object of the present invention is the provision of such processes and apparatus in which catalyst and reactants can be added in a staged manner to minimize yield losses.

A further object of the present invention is the provision of such a process and apparatus in which additional digestion stages are provided to insure sufficient time for the reaction, the residence times in these stages variable as desired.

The present invention recognizes and addresses the previously-mentioned long-felt needs and provides a satisfactory meeting of those needs in its various possible embodiments. To one of skill in this art who has the benefits of this invention's teachings and disclosures, other and further objects and advantages will be clear, as well as others inherent therein, from the following description of presently-preferred embodiments, given for the purpose of disclosure, when taken in conjunction with the accompanying drawings. Although these descriptions are detailed to insure adequacy and aid understanding, this is not intended to prejudice that purpose of a patent which is to claim an invention no matter how others may later disguise it by variations in form or additions or further improvements.

DESCRIPTION OF THE DRAWINGS

So that the manner in which the above-recited features, advantages and objects of the invention, as well as others which will become clear, are attained and can be understood in detail, more particular description of the invention briefly summarized above may be had by reference to certain embodiments thereof which are illustrated in the appended drawings, which drawings form a part of this specification. It is to be noted, however, that the appended drawings illustrate preferred embodiments of the invention and are therefore not to be considered limiting of its scope, for the invention may admit to other equally effective equivalent embodiments.

DESCRIPTION OF PREFERRED EMBODIMENTS

Figure 1:
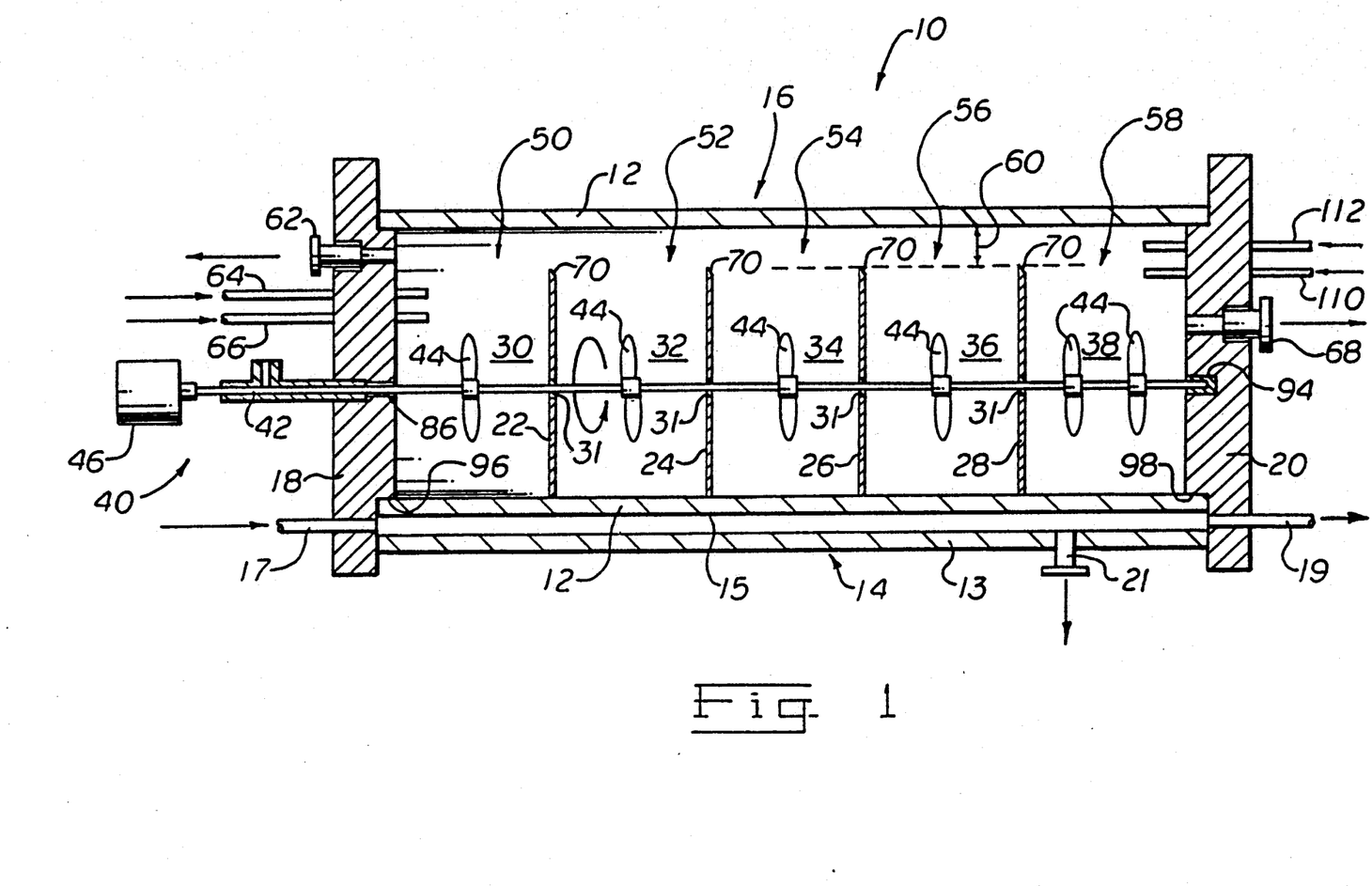
FIG. 1 is a side schematic view in cross-section of a horizontal reactor system according to the present invention.

As shown in FIG. 1, a reactor system 10 according to the present invention has a generally horizontal multi-compartment cylindrical glass vessel 12 having a bottom 14, a top 16, an inlet flange 18 and an outlet flange 20. These members are preferably made from glass-filled PTFE [Teflon (TM) material] and are joined together by a silicone based adhesive (e.g. Silastic (TM) adhesive). The flanges and multiple baffle plates 22, 24, 26, 28 define the various compartments 30, 32, 34, 36 and 38, respectively and serve as overflow weirs between compartments. It is within the scope of this invention to provide a vessel with two or more compartments. The inlet flange 18 has an interior recessed edge 96 and the outlet flange 20 has an interior recessed edge 98 for facilitating the mounting of the vessel 12.

A stirring mechanism 40 includes a motor 46 which turns a shaft 42 which extends from and through the inlet flange 18 and into each compartment through holes 31 in the baffle plates. Stirring agitators 44 are secured to the shaft 42 rotated by a motor 46. The shaft 42 extends into and is supported by a stirring shaft support sleeve 94 in the flange 20 and a shaft support sleeve 86 in the flange 18. As shown, the final compartment 38 has two stirring devices. Two stirring devices are advantageous in this compartment because additional agitation is needed to handle large salt concentrations; i.e., it is desirous to keep by-product salts suspended in liquid in the compartments.

Each of the other compartments has one stirring device. Of course it is within the scope of this invention to provide a compartment without a stirrer or to provide multiple stirrers in each compartment. Also, although propellertype stirrers are shown, it is within the scope of this invention to utilize any appropriate conventional stirring device. Individual stirrers for individual compartments each with its own shaft and motor may be provided.

Spaces 50, 52, 54, 56 and 58 above the compartments 30, 32, 34, 36, and 38 respectively are each in communication with a space 60 in the top of the vessel 12. Gases and vapors with by-products from the reaction in any of the compartments can be drawn off through the space 60 through a discharge opening 62 in inlet flange 18. A vacuum pump, not shown, can be used to facilitate the withdrawal of material through vapor discharge opening 62.

Reactants are fed into initial compartment 30 through feed lines through inlet opening 66 in inlet flange 18. Catalyst is fed into compartment 30 through feed lines through inlet opening 90 in inlet flange 18. The resulting product is withdrawn from a product outlet 68 in the outlet flange 20. Caustic feeds (e.g. alkali hydroxides) may be introduced into the vessel 12 through feed lines through a caustic feed inlet in the outlet flange 20. Recycled azeotropes [e.g. from unreacted epichlorohydrin; phenolic feed (proton-containing compound); co-solvents (if employed); or water] may be fed back into the vessel through lines through the liquid return inlet. The glass vessel 12 can be heated with infrared heat lamps to achieve a desired temperature within the reactor vessel. As shown schematically in FIG. 1 catalyst may be introduced to each of the compartments 30, 32, 34, 36, and 38 through catalyst inlets 90, 110, 112, 114, and 116, respectively, through feed lines (not shown) to each compartment. Thermocouples 88, 102, 104, 106, 108 are used to measure the temperatures in the compartments for control of enthalpy addition or removal and extend into the liquid phase in each compartment. It is preferred that the baffle plates have a top knife edge 70 as shown in FIG. 1 to facilitate smooth flow of liquids and so that no flat surface is provided on which salts might be deposited.

Figure 2:
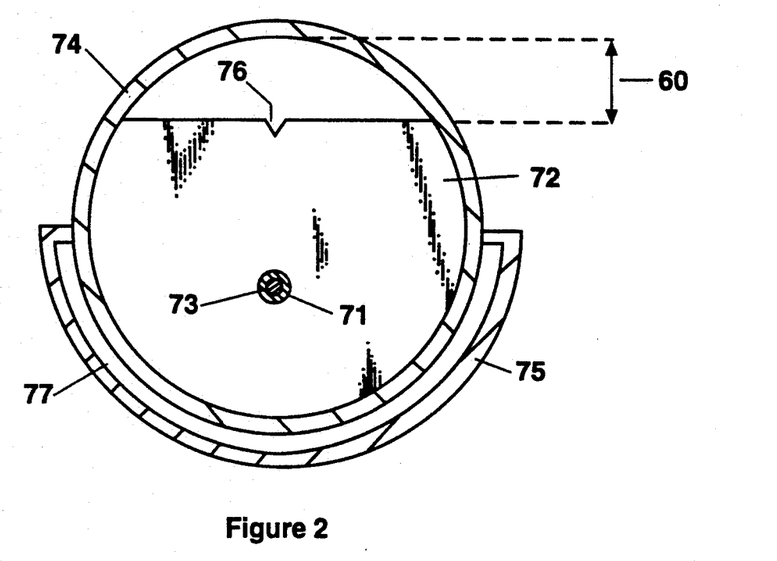
FIGS. 2 and 3 are front views of baffle plates useful in reactor design according to the present invention.
Figure 3:
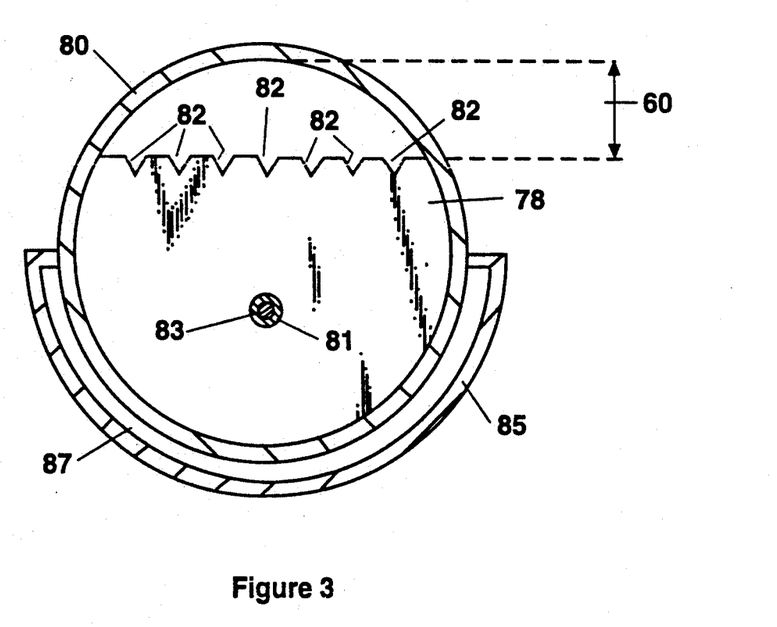

FIGS. 2 and 3 show front views of preferred baffle plates according to the present invention. In FIG. 2 a baffle plate 72 (e.g. similar to previously-described baffle plate 22) is a Teflon (TM) PTFE material plate about ⅜ inch thick mounted in a vessel 74, partially shown, (like vessel 12). The plate 72 has a single central "V" notch 76. Such a notch is advantageous because the velocity of the reaction mixture is increased at the notch to minimize the formation of a solid salt dam. As shown in FIG. 3, a baffle plate 78 in a vessel 80 may have a plurality of notches 82. This is advantageous because at higher liquid flow rates a plurality of notches will increase the reactor liquid volume above that provided by a single large "V" notch.

Figure 3A:
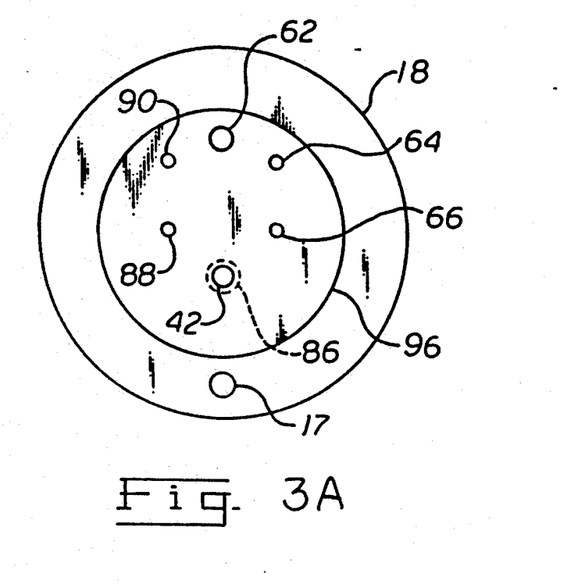
FIG. 3A is a front view of an inlet flange for the system of FIG. 1.
Figure 3B:
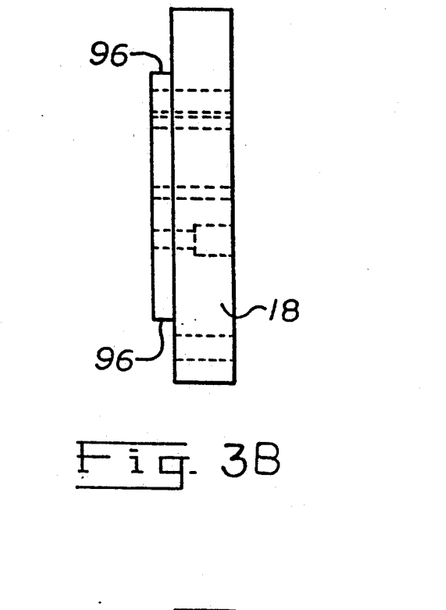
FIG. 3B is a side view of the flange of FIG. 3A.

FIGS. 3A, 3B, 4A, and 4B show the various lines, inlets, and outlets for the inlet flange 18 and the outlet flange 20 of the vessel 12 of FIG. 1. As shown in FIGS. 3A and 3B, the inlet flange 18 with its recessed edge 96 has:

Vapor outlet line 62
Thermocouple line 88
Catalyst inlet line 90
Feed Mixture inlet 66
Liquid return inlet 64
Bearing sleeve 86

Figure 4A:
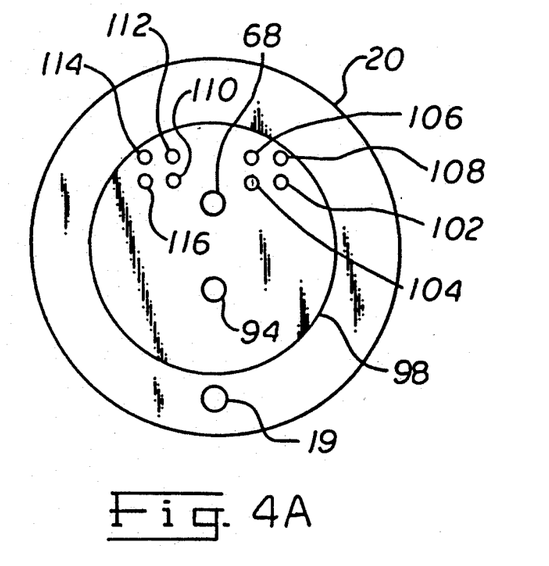
FIG. 4A is a front view of an outlet flange for the system of FIG. 1.
Figure 4B:
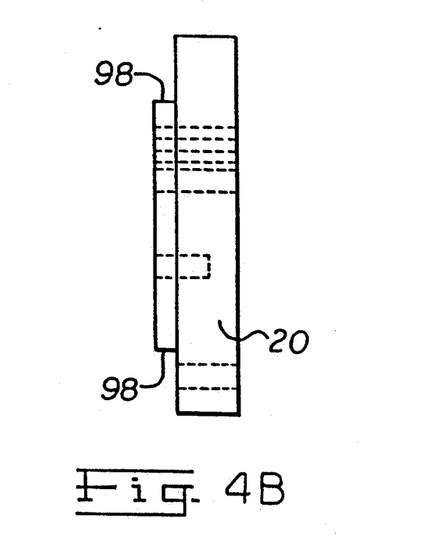
FIG. 4B is a side view of the flange of FIG. 4A.

As shown in FIGS. 4A and 4B, the outlet flange 20 with its recessed edge 98 has:

Catalyst inlets 114, 112
Thermocouple lines 106, 108, 102, 104
Product outlet line 68
Catalyst inlets 110, 116
Shaft support sleeve 94

EXAMPLE 1

A five-compartment reactor system as shown in FIG. 1 has the first four compartments as reaction stages and the final compartment as a digestion stage (no catalyst added).

44.4 ml/min of a 10:1 molar ratio mixture of epichlorohydrin and bisphenol A are fed to the first stage of the reactor. A 23.6 ml/min stream of DOWANOL*PM (a glycol monoether solvent) is simultaneously fed to the first reactor stage. 1.2 ml/min of a 50 weight % aqueous sodium hydroxide solution was fed to each of the four reaction stages. The reactor is operated at about 165 mm Hg pressure and about 65° C. At these operating conditions, the water concentration in the reactor are controlled at less than 1.3 weight %. The product of this reaction is a liquid epoxy resin containing 200 ppm of hydrolyzable chlorides with a bisphenol A conversion of 99.85% and an epichlorohydrin yield of 96% (losses to undersirable non-recycled by-products were 4% of the epichlorohydrin fed into the reactor.) The ratio of equivalents of sodium hydroxide to equivalents of bisphenol A is 1.001. The total residence time is 110 min.

The water concentration is controlled at less than 1.3 weight % since the vapor liquid equilibria of the solvent system at reaction temperature and pressure define the composition of both liquid and vapor phases in the reactor compartments.

Residence time per compartment is 22 minutes; total time in the compartments is 110 minutes. For this reaction and this system it is preferred: that total residence time range between 100 and 500 minutes, with 100 to 150 minutes most preferred; and that the system have between five to ten compartments.

EXAMPLE 2

The reactor system of Example 1 is used. 46.3 ml/min of a 10:1 molar ratio mixture of epichlorohydrin and bisphenol A and 25. ml/min of DOWANOL*PM are fed to the first stage of the horizontal reactor. 1.3 ml/min of a 50 weight % aqueous sodium hydroxide solution is fed to each of the four reaction stages. The reactor was operated at about 165 mm Hg pressure and a temperature of about 65° C. The water concentration is controlled at less than 1.3 weight %. The product of this reaction was a liquid epoxy resin containing 250 ppm of hydrolyzable chlorides with a bisphenol A conversion of 99.5% and an epichlorohydrin yield of 98%. The equivalence ratio of sodium hydroxide to bisphenol A is 1.07. The total residence time is 105 min.

The residence time per compartment is 21 minutes.

Figure 5:
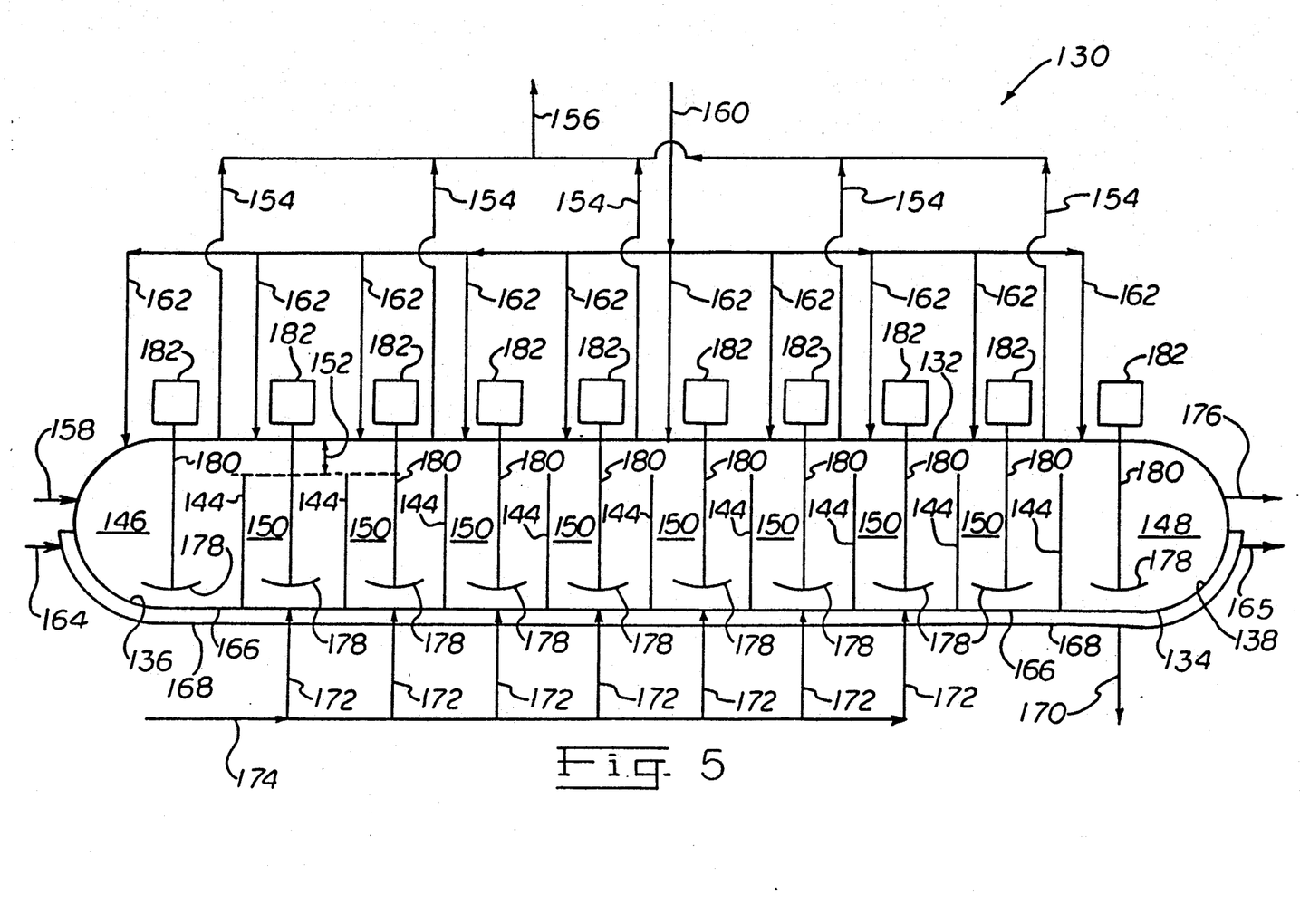
FIG. 5 is a side schematic view of a reactor system according to the present invention.

FIG. 5 illustrates schematically another embodiment of a reactor system according to the present invention. A reactor system 130 has a generally cylindrical vessel 132 having a side wall 134 and end heads 136 and 138. 140 indicates a weld line for the head 136 and 142 is a similar line for the head 138. Baffle plates 144 define end compartments 146 and 148 and intermediate compartments 150. Each compartment opens to a common overhead space 152 in the vessel 132.

Vapor generated in the compartments flows into the space 152 and exits the vessel 132 through vapor outlets 154 which flow to common outlet 156. Initial liquid reactant feed flows into compartment 146 through feed line 158. Liquid return [from an overhead phase separation system (not shown) which separates undesired water from the organic solvent system] flows into each compartment through a main liquid return line 160 which feeds the subordinate liquid return lines 162 flowing into each compartment.

Steam via a feed line 164 provides heat for reaction in each compartment. The steam flows between an outer surface 166 of the vessel 132 and a vessel jacket 168. Cooled condensate flows out through a drain 120.

Catalyst is fed into each compartment through catalyst feed lines 172 which are in turn fed through a main catalyst feed line 174. Product is removed through a product outlet line 176 extending from the compartment 148.

Each compartment has a stirrer with a blade 178 secured to a shaft 180 which is turned by a motor 182 on top of the vessel 132. The blades 178 as shown induce an axial flow component into liquids in the compartments. Such a flow is advantageous because it reduces splashing at the vapor/liquid interface in the compartments that could result in increased salt deposits on the tops of the baffle plates.

Figure 6A:
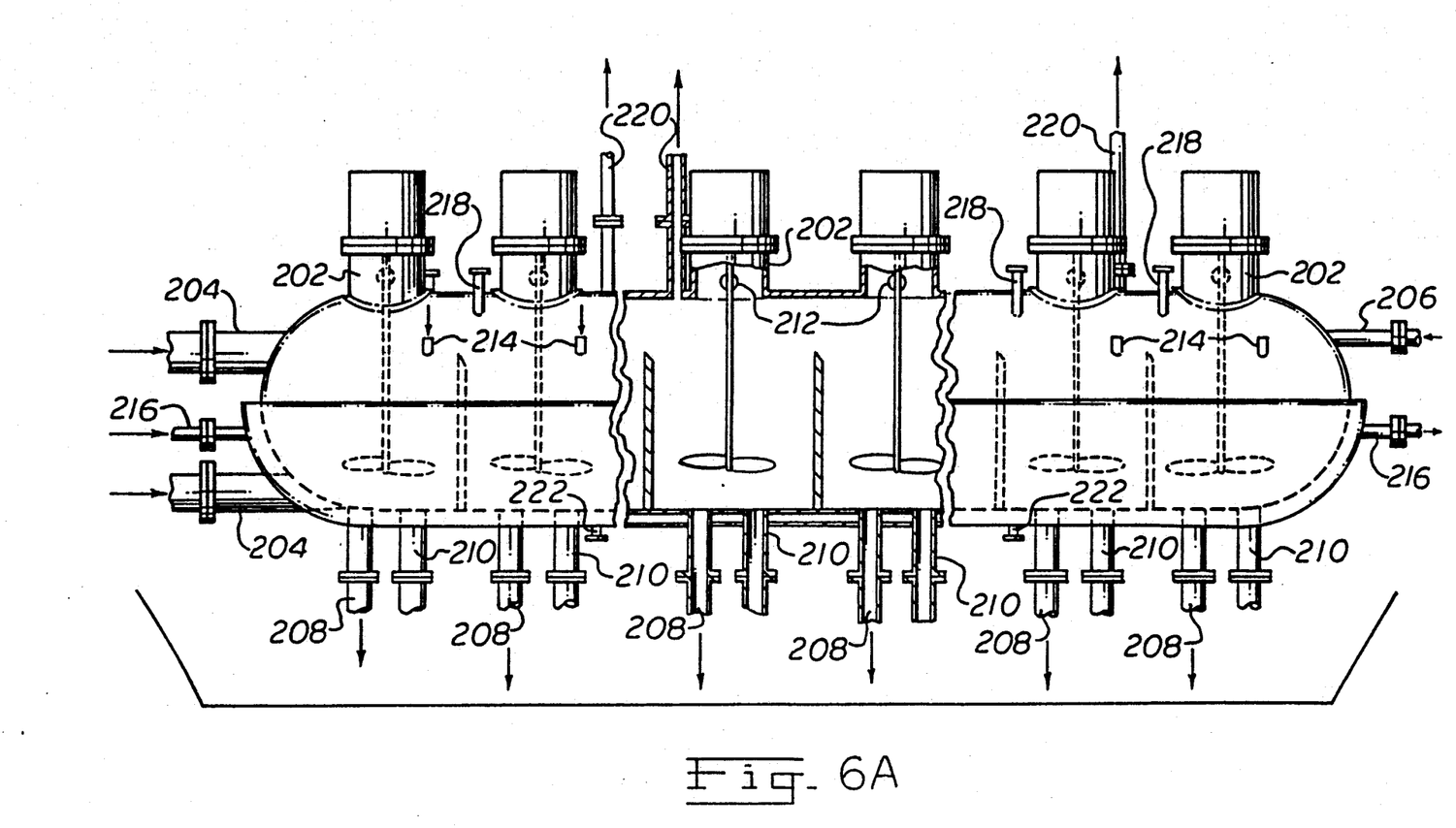
FIG. 6A is a side view of a system according to the present invention.
Figure 6B:
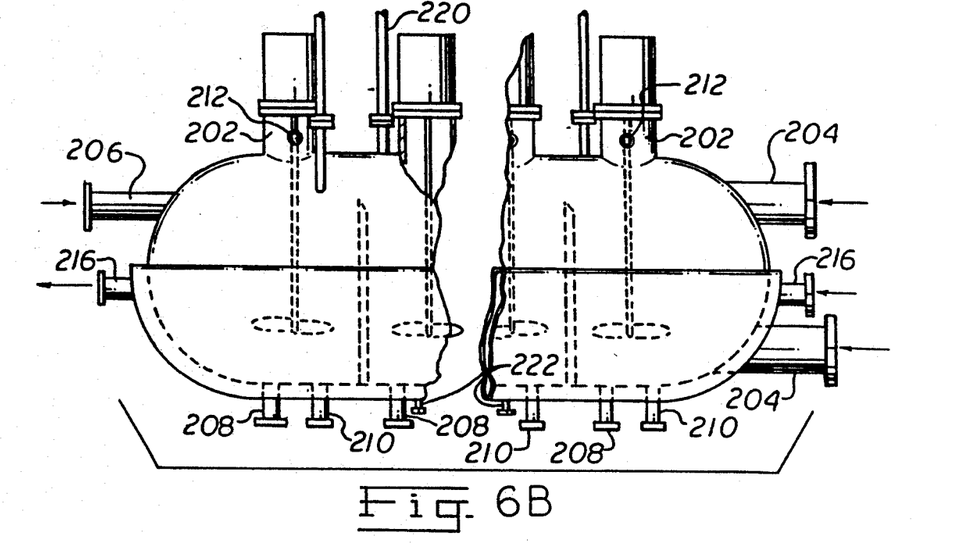
FIG. 6B is a side view opposite to that of FIG. 6A.
Figure 6C:
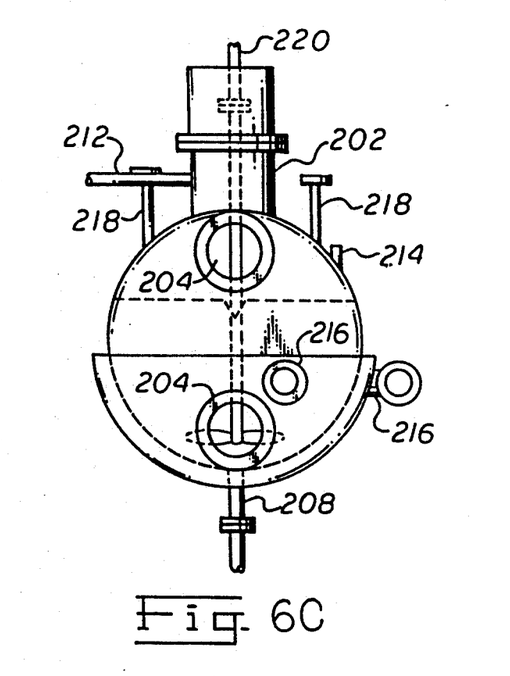
FIG. 6C is an end view of the system of FIG. 6A.

FIGS. 6A, 6B, and 6C illustrate various exterior views of a system according to the present invention. The various inlets, outlets, and nozzles are as follows:
A: Mounting flanges for stirring mechanisms;
B: Mountings for liquid level sensing instrumentation;
C: Feed mixture inlet nozzle;
D: Product outlet and compartment drains;
E: Sample ports for each compartment;
F: Catalyst inlet nozzles;
G: Liquid return from phase separation system;
H: Stream inlet to jacket;
I: Thermocouple mounting flanges; and
J: Vapor outlet nozzles.

In another embodiment of a process according to the present invention a reactor such as that of FIG. 1 or FIG. 5 is employed to produce epichlorohydrin in the vapor phase from each compartment with the liquid stream containing effluent brine.

Preferred embodiments of a reactor according to the present invention may be used in processes for producing liquid epoxy resins in which: the preferred temperatures range between about 40° C. and about 100° C.; with pressures ranging between about 50 mm Hg and about atmospheric pressure (760 mm Hg); water concentrations ranging between about 0.2 weight percent and about 6 weight percent, but in all cases below the saturation limit of the liquid phase in the reactor, with an amount equal to or less than 4 percent preferred; the preferred catalysts are sodium hydroxide and potassium hydroxide; and bisphenol A conversion rates ranging between about 50% (e.g. for producing high molecular weight, low chloride content epoxy resins) and up to almost 100%, and most preferably equal to or greater than about 98%.

Vapor weirs or baffles with a portion submerged in the liquid could be used to allow removal of vapors of different compositions. Such underflow weirs permit control of the composition of vapor in the compartments.

It is within the scope of the present invention to produce epihalohydrins from the reaction of an alkali metal hydroxide, particularly sodium hydroxide or potassium hydroxide with 1,3-dihalo-2-propanol, 2,3-dihalo-1- propanol, 3-halo-1,2-propanediol and mixtures thereof to form epihalohydrins or 2,3-epoxy-1-propanol (glycidol). Suitable epihalohydrins include epichlorohydirn, epibromohydrin or epiiodohydrin. The desired products are removed from the apparatus via azeotropic or codistillation as a vapor from the reactor. Suitable temperatures for conducting this reaction is from about 60° C. to about 120° C., preferably from about 70° C. to about 100° C. more preferably from about 80° C. to about 90° C. Suitable pressures for conducting this reaction is from about 3 psia to about 8 psia, preferably from about 4 psia to about 7 psia, more preferably from about 5 psia to about 6 psia.

It is also within the scope of the present invention to produce propylene oxide from the reaction of an alkali metal hydroxide, particularly sodium hydroxide or potassium hydroxide, with 1-chloro-2-propanol or 2-chloro-1-propanol or a mixture of 1-chloro-2-propanol and 2-chloro-1-propanol. Suitable temperatures for conducting this reaction is from about 60° C. to about 120° C., preferably from about 70° C. to about 110° C. more preferably from about 80° C. to about 100° C. Suitable pressures for conducting this reaction is from about 2 psia to about 7 psia, preferably from about 3.5 psia to about 6 psia, more preferably from about 4.5 psia to about 5 psia.

It is also within the scope of the present invention to produce phenol and isopropenyl phenol from the base catalyzed decomposition of bisphenol A. The desired products from this reaction are distilled from the reactor as vapors. Suitable temperatures for conducting this reaction is from about 160° C. to about 280° C., preferably from about 180° C. to about 260° C. more preferably from about 200° C. to about 240° C. Suitable pressures for conducting this reaction is from about 0.1 psia to about 2 psia, preferably from about 0.2 psia to about 1.5 psia, more preferably from about 0.4 psia to about 0.8 psia.

A feed with 3-chloro-2-hydroxypropyl methacrylate (CHPMA), epichlorohydrln, and minor amounts of by-products (GMA and heavies such as polymer by-product materials) flows into an epoxidation reactor to which aqueous alkali metal hydroxides such as sodium hydroxide (NaOH) or potassium hydroxide (KOH) and additional epichlorohydrin are added. KOH reacts with CHPMA to form glycidyl methacrylate to (GMA), water, and potassium chloride (KCl). Sodium hydroxide may be used in place of KOH, but a higher GMA yield is obtained using KOH. Preferable reaction conditions are: starting molar epichlorohydrin/CHPMA ratio of 6.0 or higher (most preferably 9.0), molar KOH/CHPMA ratio of 0.8-1.5 (most preferably 1.1, temperature of 40-80 degrees centigrade (most preferably 60-65 degrees Centigrade), and a pressure of less than atmospheric (typically 150-200 mm Hg absolute). Preferably, KOH is added as a 40-60 weight per cent solution in water. A vapor stream removed from the epoxidation reactor is fractionated and the overhead epichlorohydrin/water stream is condensed and allowed to separate into two liquid phases. The heavier (organic) phase is returned to the fractionation tower as reflux and from the bottom of the fractionation tower to the epoxidation reactor. (See FIG. 7 and previous description thereof). The aqueous phase is sent forward in the process in the same manner as previously described for the epoxy process to serve as wash water which removes the last traces of KCl from the GMA product before the epichlorohydrin is stripped and the product recovered.

In one embodiment according to this invention an epoxidation reactor is a continuous 10 stage system contained in a single vessel (similar to the reactor shown in FIG. 6A). Flow rates of feeds to the reactor are controlled to maintain the total residence time in the reactor between 4 and 12 hours, (preferably, 7 to 9 hours). Reactants are added to each stage and vapor removal is achieved by maintaining a constant pressure and temperature over the entire reactor. It is preferred that water concentration be maintained within a range of from about 2 to about 4 weight percent, with 2 weight percent or less most preferred.

In addition to glycidyl methacrylate, water, and potassium chloride, other by-products of the epoxidation reaction include: glycerine dichlorohydrin, glycidol, heavies, and the potassium salt of any methacrylic acid which might be present in the reactor feed stream. Control of by-products, especially glycerine dichlorohydrin, is important in affecting the efficiency of downstream finishing operations. Typical glycidyl methacrylate yields, based on starting GMA of 70% or greater are obtained (at least 90 per cent most preferred), preferably at CHPMA conversions of at least 85% (with at least 95% most preferred).

EXAMPLE 3

A mixture of CHPMA and epichlorohydrin, in a molar ratio of 1:20, was fed to a 10-stage reactor (like that shown in FIG. 6A) at a flow rate of 58–70 lb/min.

Figure 7:
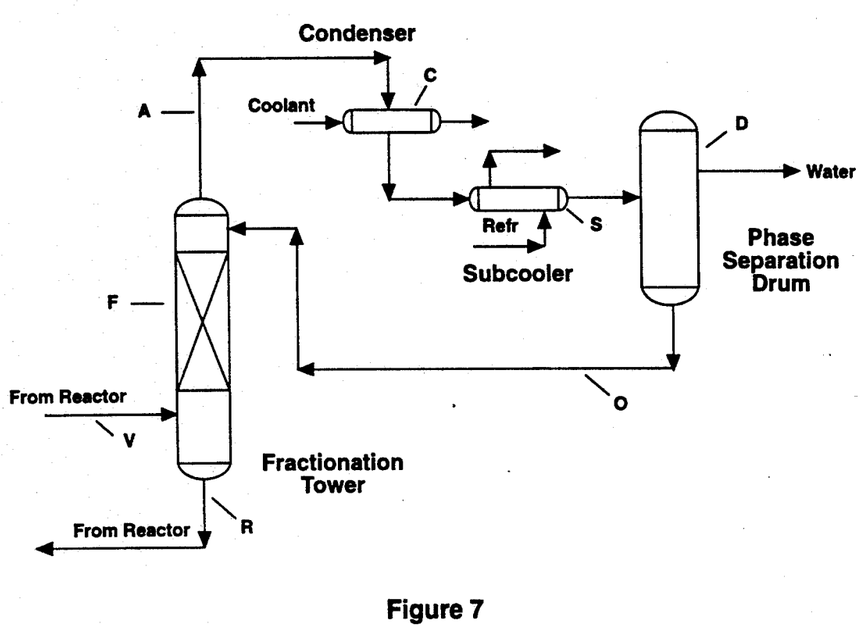

The flow was divided equally between the stages. A 45 weight-per cent solution of potassium hydroxide was separately fed to the same reactor stages, at 3 pounds/min, to effect epoxidation of the CHPMA. The reactor conditions included a temperature of 65 degrees Centigrade a pressure of 200 mm Hg pressure. Water was azeotropically removed through an overhead system (as shown in FIG. 7). The organic phase from the overhead system was returned to the reactor and equally distributed to each reactor section. The reaction product stream contained GMA, CHPMA, epichlorohydrin, and other by-products, in ratios representing 85% conversion of CHPMA and 90% yield to GMA.

In conclusion, therefore, it is seen that the present invention and the embodiments disclosed herein are well adapted to carry out the objectives and obtain the ends set forth at the outset. Certain changes can be made in the method and apparatus without departing from the spirit and the scope of this invention. It is realized that changes are possible and it is further intended that each element or step recited in any of the following claims is to be understood as referring to all equivalent elements or steps for accomplishing substantially the same results in substantially the same or equivalent manner. It is intended to cover the invention broadly in whatever form its principles may be utilized. The present invention is, therefore, well adapted to carry out the objects and obtain the ends and advantages mentioned, as well as others inherent therein.

I claim:

1. A process for the continuous preparation of reaction products from the reaction of liquid reactant materials wherein said liquid reactant materials comprise either: epihalohydrin, an active hydrogen containing species and an alkali metal hydroxide; an unsaturated organic acid derivative, alkali metal hydroxide and an epihalohydrin; alkali metal hydroxide and 1-chloro-2- propanol or 2-chloro-1-propanol or mixture of 1-chloro-2propanol and 2-chloro-1-propanol; or bisphenol A and alkali metal hydroxide, the process comprising contacting the reactant materials for producing the reaction products in a first compartment of a horizontal reactor system, flowing reaction products and by-products from the first compartment of the reactor system to at least one more compartment of the reactor system and adding additional reactant materials to the at least one more compartment all compartments intercommunicating with each other, withdrawing vapor reaction products from the compartments from a common space above them, and withdrawing the liquid reaction products from at least one compartment of the reactor system.

2. The process of claim 1 including stirring the liquid reactant materials in at least one of the compartments.

3. The process of claim 2 wherein the liquid reactant materials comprise epihalohydrin, an active hydrogen containing species and an alkali metal hydroxide.

4. The process of claim 3 wherein the reactant materials comprise bisphenol and epichlorohydrin and the reaction products are liquid epoxy resins which are diglycidyl ethers of bisphenol.

5. The process of claim 4 wherein the reactant materials comprise bisphenol A and epichlorohydrin and the reaction products are liquid epoxy resins which are diglycidyl ethers of bisphenol A.

6. The method of claim 5 wherein a solvent is introduced into the vessel and by-product water is removed in a codistillate of the solvent and water.

7. The process of claim 6 wherein the water concentration is maintained within a range of from about 0.2 to about 4 weight percent.

8. The process of claim 7 wherein the water concentration is maintained at about 2 weight percent.

9. The process of claim 6 wherein the pressure within the reactor is between about 50 mm Hg and about 760 mm Hg.

10. The process of claim 5 wherein the temperature is between about 40° C. and about 100° C.

11. The process of claim 5 including introducing either sodium hydroxide or potassium hydroxide into at least one of the compartments of the system.

12. A process for the continuous preparation of a liquid epoxy resin, the process including introducing epihalohydrin and an active hydrogen-containing species into an initial compartment of a horizontal reactor system along with an alkali metal hydroxide, stirring the materials in the initial compartment, the materials reacting to form as a reaction product a glycidyl derivative of the active hydrogen-containing species, flowing the reaction product over a weir into a next adjacent compartment of the horizontal reactor system, adding additional alkali metal hydroxide to said next adjacent compartment and stirring the materials therein, flowing reaction product from said next. adjacent compartment to one or more additional reaction compartments of the horizontal reaction system, introducing a solvent into the horizontal reactor system, removing by-product water from reactions in the compartments in a codistillate of the solvent and the by-product water from a common space above the compartments with which each compartment communicates, and withdrawing reaction products from at least one of the compartments of the horizontal reactor system.

13. A process for the continuous preparation of a liquid epoxy resin, the process comprising introducing a 10:1 molar ratio mixture of epichlorohydrin and bisphenol A along with a stream of a glycol monoether solvent to a first compartment of a multiple-intercommunicating-compartment horizontal continuous reactor system, each compartment communicating with a common overhead space within the system, feeding aqueous sodium hydroxide into each of the compartments of the system except to a last compartment, liquid reaction product flowing from one compartment to a next adjacent compartment and thus through all compartments, maintaining pressure in the system at about 165 mm Hg, maintaining temperature in the system at about 65° C., controlling the water concentration in the system at less than 1.3 weight %, withdrawing a liquid epoxy resin product from the last compartment, total residence time of reactants in the compartments ranging between 100 and 500 minutes, the epichlorohydrin yield at least 96%, and with at least 99% bisphenol conversion.

14. The process of claim 2 wherein the liquid reactant materials comprise an unsaturated organic acid derivative alkali metal hydroxide and an epihalohydrin and the reaction product is the glycidyl ester of unsaturated organic acid derivative.

15. The process of claim 14 wherein the organic acid derivative is 3-chloro-2-hydroxypropyl methacrylate, the epihalohydrin is epichlorohydrin, and the reaction product is glycidyl methacrylate.

16. The method of claim 15 wherein a solvent is introduced into the vessel and by-product water is removed in a codistillate of the solvent and water.

17. The process of claim 16 wherein the water concentration is maintained within a range of from about 2to about 4 weight percent.

18. The process of claim 17 wherein the water concentration is maintained at about 2 weight percent or less.

19. The process of claim 15 wherein the pressure within the reactor is between about 150 mm Hg and about 200 Hg.

20. The process of claim 15 wherein the temperature is between about 40° C. and about 100° C.

21. The process of claim 15 including introducing potassium hydroxide into at least one of the compartments of the system.

22. A process for the continuous preparation of glycidyl methacrylate the process comprising introducing a 4.0 molar ratio mixture of a epichlorohydrin and 3-chloro-2-hydroxypropyl methacrylate ("CHPMA") to a first compartment of multiple-intercommunicating-compartment horizontal continuous reactor system, each compartment communicating with a common overhead space within the system, feeding aqueous potassium hydroxide into each of the compartments of the system except to a last compartment, liquid reaction product flowing from one compartment to a next adjacent compartment and thus through all compartments, maintaining pressure in the system at about 200 mm Hg, maintaining temperature in the system at about 65° C., controlling the water concentration in the system at less than 1.3 weight percent, withdrawing glycidyl methacrylate product from the last compartment, total residence time of reactants in the compartments ranging between 4 and 12 hours, the glycidyl methacrylate yield at least 90%, and with at least 85% CHPMA conversion.

23. The process of claim 2 wherein the liquid reactant materials comprise alkal metal hydroxide and 1-chloro-2-propanol or 2-chloro-1-propanol or mixture of 1- chloro-2-propanol and 2-chloro-1-propanol and the reaction product is propylene oxide removed as a vapor and by-product salts and unreacted reactants are removed as a liquid or a solid suspended in a liquid.

24. The process of claim 2 wherein the liquid reactant materials comprise bisphenol A, the reaction product is phenol and isopropenyl phenol removed as a vapor and by-product tar, unreacted bisphenol A and catalyst are removed as a liquid and the reaction is conducted in the presence of alkali metal hydroxide as a catalyst.

* * * * *

UNITED STATES PATENT AND TRADEMARK OFFICE
CERTIFICATE OF CORRECTION

PATENT NO. : 5,245,057
DATED : September 14, 1993
INVENTOR(S) : Robert P. Shirtum It is certified that error appears in the above-identified patent and that said Letters Patent is hereby corrected as shown below:

In claim 1, line 2, column 11, "2propanol" should read --2-propanol--.

In claim 12, line 57, column 11, delete the period after "next".

In claim 17, line 33, column 12, "2to" should read --.2 to--.

Signed and Sealed this

Fifth Day of July, 1994

Attest:

BRUCE LEHMAN

Attesting Officer

Commissioner of Patents and Trademarks